United States Patent [19]
Minoda

[11] Patent Number: 5,485,447
[45] Date of Patent: Jan. 16, 1996

[54] HIGH-SPEED DATA DUBBING METHOD

[75] Inventor: Hidenori Minoda, Higashihiroshima, Japan

[73] Assignee: Sharp Kabushiki Kaisha, Osaka, Japan

[21] Appl. No.: 243,145

[22] Filed: May 16, 1994

[30] Foreign Application Priority Data

Jul. 22, 1993 [JP] Japan .................................... 5-181338

[51] Int. Cl.⁶ ..................................................... G11B 7/00
[52] U.S. Cl. ................ 369/84; 369/59; 369/60; 369/47; 360/15
[58] Field of Search ........................... 369/54, 58, 59, 369/60, 47, 48, 49, 83, 84; 360/13, 14.1, 14.2, 14.3, 15

[56] References Cited

U.S. PATENT DOCUMENTS

| | | | |
|---|---|---|---|
| 4,823,333 | 4/1989 | Satoh et al. | 369/84 |
| 5,212,678 | 5/1993 | Roth et al. | 369/60 |
| 5,224,087 | 6/1993 | Maeda et al. | 369/47 X |

FOREIGN PATENT DOCUMENTS

| | | |
|---|---|---|
| 3-119559 | 5/1991 | Japan . |
| 4-258834 | 9/1992 | Japan . |
| 4-332960 | 11/1992 | Japan . |

Primary Examiner—Georgia Y. Epps
Assistant Examiner—Muhammad N. Edun
Attorney, Agent, or Firm—Nixon & Vanderhye

[57] ABSTRACT

In a high-speed dubbing method, calculations are executed to find waiting time by which the amount of remaining audio data stored in a memory is minimized upon completion of a data transferring process to the next recordable area, and by stopping the recording operation for the waiting time, the amount of the remaining audio data in the memory is always kept minimum, immediately before the accessing process and the track jumping process with respect to the next recordable area. Therefore, even if any disturbance occurs during the dubbing operation with respect to a plurality of intermittent recordable areas, it is possible to eliminate the overflow of the audio data, and to improve the reliability of the dubbing operation.

29 Claims, 5 Drawing Sheets

HIGH-SPEED DATA DUBBING METHOD

FIELD OF THE INVENTION

The present invention relates to a high-speed data dubbing method for dubbing data transmitted from an external apparatus, such as a compact disk apparatus or other apparatuses, onto a recording medium such as a mini disk or other recording medium at high speeds.

BACKGROUND OF THE INVENTION

There have been proposed methods wherein data dubbing is made at relatively low speeds between a recording system and a reproduction system both of which use recording media for recording compressed data (for example, see Japanese Laid-Open Patent Publications No. 332960/1992 (Tokukaihei 4-332960) and No. 258834/1992 (Tokukaihei 4-258834)). In accordance with these methods, a recording medium whereon compressed data is recorded is reproduced by a system on the reproduction side, and the reproduced data is recorded on another recording medium by another system on the recording side. However, these dubbing methods do not suggest anything about how to make a dubbing at high speeds.

In order to dub data at high speeds, there has been known a method wherein data is temporarily stored in a buffer memory by using a reproduction bit rate on the reproduction side that is N (natural number) times as great as a normal bit rate, and the stored data is read on demand and written in a recording medium on the recording side.

With this method, it is possible to make data dubbing virtually N times as fast as the normal speed. The following description will discuss the conventional high-speed dubbing method by exemplifying a case wherein a compact disk (hereinafter, referred to as CD) reproduction apparatus is used on the reproduction side and a mini disk (hereinafter, referred to as MD) recording apparatus is used on the recording side.

The MD recording apparatus compresses inputted digital data into almost one-fifth the size of the data amount. For this reason, suppose that the recording bit rate of the MD recording apparatus is equal to the reproduction bit rate of the CD, it is possible to increase the reproduction bit rate of the CD by almost five times. In other words, data reproduced in the CD reproduction apparatus by using a reproduction bit rate that is almost five times as great as the normal bit rate is stored in a buffer memory, and after accessing and track jumping with respect to a desired recordable area in the MD, the data is read from the buffer memory on demand, and written in the MD. Thus, data dubbing is made from the CD on the reproduction side to the MD on the recording side at high speeds.

However, in the above-mentioned conventional high-speed data dubbing method, the reproduction bit rate on the reproduction side is N (natural number) times as great as the normal bit rate. For this reason, writing operations and interruptions between them take place very frequently, and space areas in the buffer memory are virtually reduced by one-Nth. Moreover, this results in an increase in the number of the accessing processes and track-jumping processes to desired recordable areas, and during these operations, data is being stored in the buffer memory at the above-mentioned reproduction bit rate. As a result, the space areas in the buffer memory are further reduced. In addition, in the event of an erroneous accessing process or track-jumping process to a desired recordable area, the space areas in the buffer memory are further reduced.

In other words, the greater the reproduction bit rate, the more frequently the accessing processes and truck-jumping processes to desired recordable areas take place. This results in a higher probability of overflow in the buffer memory, thereby raising a serious reliability problem in data dubbing.

SUMMARY OF THE INVENTION

It is an objective of the present invention to provide a high-speed data dubbing method for improving the reliability of data dubbing as well as dubbing data onto a desired recordable area on a recording medium at high speeds.

In order to achieve the above objective, the high-speed data dubbing method of the present invention is characterized by comprising the steps of: storing data externally transmitted in a memory at a transmission speed that is higher than that of normal reproduction, but lower than a transfer speed to a recording medium; recognizing respective recording start positions in accordance with positional information of the recording medium having a plurality of intermittent recordable areas; recognizing amounts of data to be recorded in the recordable areas including the respective recording start positions; calculating waiting time by which the amount of remaining data stored in the memory is minimized upon completion of the data transferring process to the recordable area, prior to transferring data to one of the recordable areas, based on the data transfer speed to the memory and the amount of data to be recorded in the recordable area; and interrupting the dubbing operation by stopping the data transferring process for the waiting time.

With this arrangement, the data externally transmitted is stored in the memory. Then, the data stored in the memory is transferred at a transfer speed that is higher than the transmission speed to the respective intermittent recordable areas on the recording medium, and dubbing is made therein.

In this case, based on the data transfer speed to the memory and the amount of data to be recorded in the recordable area, calculations are executed to find the waiting time by which the amount of remaining data stored in the memory is minimized upon completion of the data transferring process to the next recordable area. Then, the data transferring process is stopped for the waiting time. It is preferable to access the next recordable position during the waiting time. Next, after the calculated waiting time has elapsed, the transferring process for the data remaining in the memory is performed with respect to the next recordable area. Here, during the dubbing operation as well as the waiting time, data is being stored in the memory at the above-mentioned transmission speed without interruption.

Moreover, in cases where the amount of data to be recorded in the recordable areas is greater in comparison with, for example, the maximum allowable amount of data storage of the memory, the amount of data to be recorded may be divided, and waiting time may be calculated with respect to each divided amount of data. In other words, depending on the amount of data to be recorded, the next recordable area may be one portion of the first recordable area, or may be the second recordable area that is different from the first recordable area.

The data dubbing is made at high speeds in desired recordable areas on the recording medium by repeating the above-mentioned operation the predetermined number of times.

For a fuller understanding of the nature and advantages of the invention, reference should be made to the ensuing detailed description taken in conjunction with the accompanying drawings.

DETAILED DESCRIPTION OF THE EMBODIMENTS

Referring to FIGS. 1 through 5, the following description will discuss one embodiment of the present invention.

Figure 1:
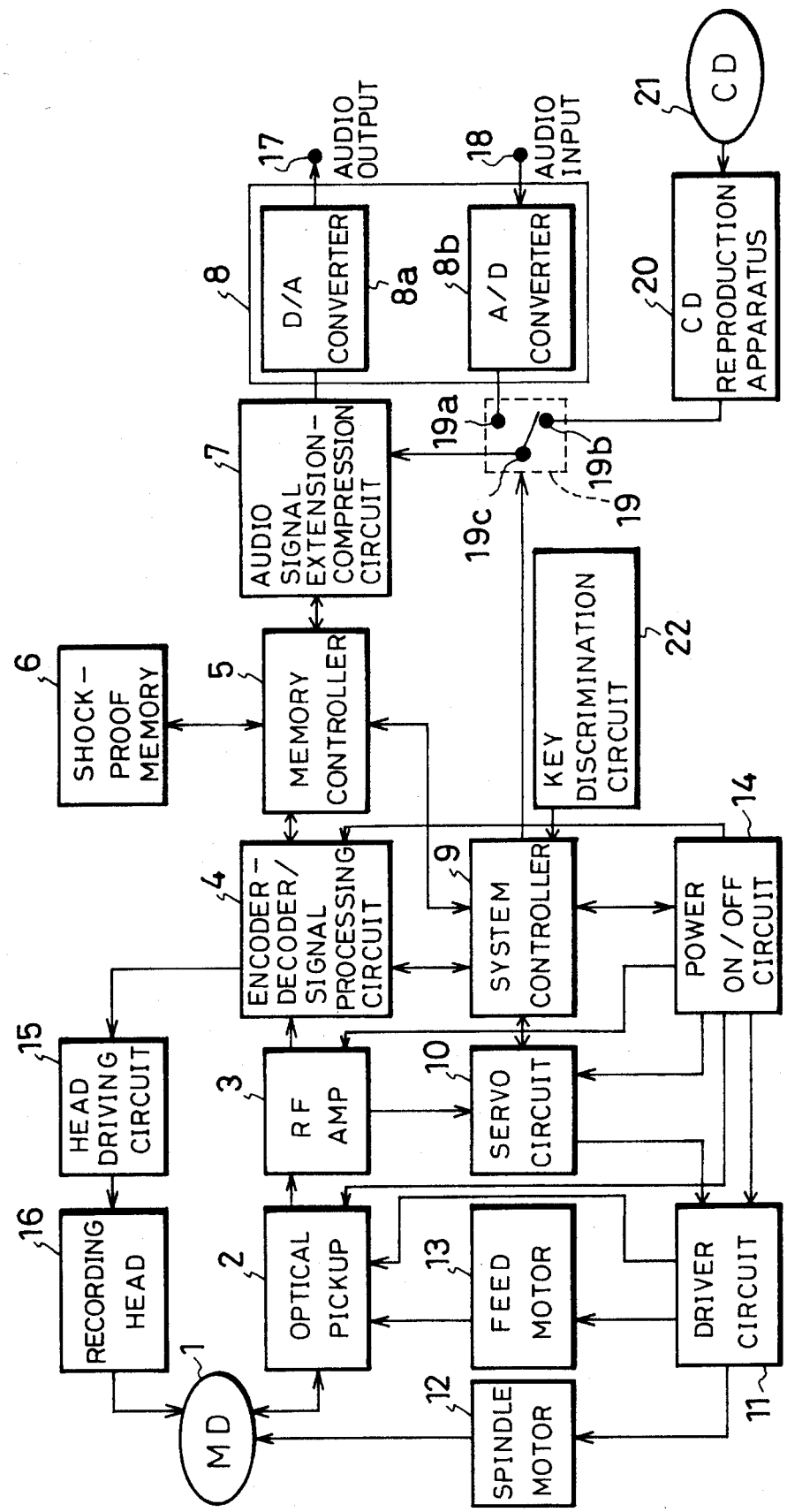
FIG. 1 is a block diagram showing one structural example of a mini disk apparatus used in a high-speed data dubbing method of the present invention.

As shown in FIG. 1, an MD (mini disk) apparatus that is used in the high-speed data dubbing method of the present embodiment is mainly constituted of: an MD 1 provided as a magneto-optical recording medium; an optical pickup 2; an RF amplifier 3; an encoder-decoder/signal processing circuit 4; a shock-proof memory controller 5 (hereinafter, referred to as memory controller); a shock-proof memory 6; an audio signal extension-compression circuit 7; a conversion circuit 8; a microcomputer for use in system controlling 9 (hereinafter, referred to as system controller); a servo circuit 10; a driver circuit 11; a spindle motor 12; a feed motor 13; a power on/off circuit 14; a head driving circuit 15; a recording head 16; a switch 19; and a key discrimination circuit 22.

The optical pickup 2 writes and reads audio data (data) in and out the MD 1. The RF amplifier 3 amplifies signals read out by the optical pickup 2. The shock-proof memory 6 temporarily stores the audio data. The audio signal extension-compression circuit 7 is constituted by an audio signal extension circuit and an audio signal compression circuit, both not shown. The conversion circuit 8 is constituted by a D/A converter 8a and an A/D converter 8b. The system controller 9 conducts various controlling operations. The switch 19 is constituted by a common terminal 19c and contacts 19a and 19b. The contact 19b is connected to a CD reproduction apparatus 20. The key discrimination circuit 22 has keys (not shown) by which the user enters instructions related to recording.

In the above arrangement, upon reproduction, the spindle motor 12 and the feed motor 13 are driven by the driver circuit 11. Then, the MD 1 is rotatively driven by the spindle motor 12 and the optical pickup 2 is shifted in the radial direction of the MD 1 by the feed motor 13. Thus, audio data recorded in the MD 1 is read by the optical pickup 2. The audio data read out by the optical pickup 2 is amplified by the RF amplifier 3, and transmitted to the encoder-decoder/ signal processing circuit 4.

Further, the RF amplifier 3 generates servo controlling signals Such as a focusing error signal, a tracking error signal, etc. in accordance with the audio data read out by the optical pickup 2, and releases these signals to the servo circuit 10. The servo circuit 10 controls the driver circuit 11 in accordance with the servo controlling signals from the RF amplifier 3 and a control signal released from the system controller 9. Then, in response to the control signals from the servo circuit 10, the driver circuit 11 drives the optical pickup 2, the spindle motor 12 and the feed motor 13 so as to allow them to activate respective servo operations such as focusing, tracking and spinning.

The encoder-decoder/signal processing circuit 4 demodulates the signals amplified by the RF amplifier 3, and after executing signal processings, such as error correction, etc. to the signals, transmits them to the memory controller 5. The memory controller 5 writes the signals transmitted from the encoder-decoder/signal processing circuit 4 in the shock-proof memory 6. The shock-proof memory 6 is provided with an area for storing TOC (Table of Content) information that is separated from recording areas for audio data. Thus, when the MD 1 is loaded, the shock-proof memory 6 promptly stores the TOC information recorded in the MD 1 at a predetermined area therein in the same manner as it records audio data.

The memory controller 5 reads necessary TOC information from the shock-proof memory 6 in response to the demand of the system controller 9, and transmits the information to the system controller 9. The system controller 9 identifies positions of respective recordable areas on the MD 1 according to the TOC information. The audio data read out from the shock-proof memory 6 is transmitted to the audio signal extension-compression circuit 7 through the memory controller 5. The audio signal extension circuit (not shown) in the audio signal extension-compression circuit 7 conducts a time-base extension on the audio data in accordance with a predetermined format. Thus, the audio signal extension-compression circuit 7 releases the audio data from its compressed state, and transmits the resulting audio data to the D/A converter 8a in the conversion circuit 8. The D/A converter 8a converts the audio data that has been subjected to the time-base extension into an analog audio signal. The analog audio signal is released to an external apparatus through the output terminal 17.

Moreover, the system controller 9 controls the power on/off circuit 14 so that the operating current is supplied and stopped to the optical pickup 2, the RF amplifier 3, the encoder-decoder/signal processing circuit 4, the servo circuit 10, and the driver circuit 11.

In the above-mentioned arrangement, recording operations which are conducted in an MD apparatus are classified into two types: analog audio signals externally inputted are recorded on the MD 1; and digital audio signals inputted from an external apparatus such as a CD reproduction apparatus 20 are recorded on the MD 1. In other words, when, upon recording, the key discrimination circuit 22 receives an instruction related to recording that is entered by the user through the keys, it discriminates which type of the recording operation is required, and sends the result of the discrimination to the system controller 9. According to the result of the discrimination, the system controller 9 switches the switch 19. Thus, upon recording, one of the two types of the recording operations is selected and executed.

In the case of recording externally inputted analog audio signals onto the MD 1, the switch 19 is controlled by the system controller 9 so that the common terminal 19c is connected to contact 19a. The audio signals are inputted to the A/D converter 8b in the conversion circuit 8 through the audio input terminal 18. After converted into digital audio data, the audio signals are sent to the audio signal extension-compression circuit 7 through the contact 19a and the common terminal 19c. The audio signal compression circuit (not shown) in the audio signal extension-compression circuit 7 conducts a data compression of virtually one-fifth on the digital audio data by utilizing an information compressing technology related to MDs, called ATRAC (Adaptive Transform Acoustic Coding), and sends the compressed audio data to the memory controller 5. The memory controller 5 writes the audio data sent from the audio signal extension-compression circuit 7 in the shock-proof memory 6o The memory controller 5, under control by the system controller 9, reads out the audio data stored in the shock-proof memory 6, and sends it to the encoder-decoder/signal processing circuit 4. The encoder-decoder/signal processing circuit 4 conducts operations such as modulation and addition of error-correcting codes on the read-out audio data.

The system controller 9 controls the memory controller 5 so as to read out TOC information stored in a predetermined region of the shock-proof memory 6. Then, the system controller 9 recognizes positions of recordable areas on the MD1 in accordance with the TOC information, and controls the servo circuit 10 so that the recording head 16 and the optical pickup 2 are driven to a desired recordable area. Further, the head driving circuit 15 modulates the magnetic field of the recording head 16 in accordance with output signals from the encoder-decoder/signal processing circuit 4, and the resulting magnetic field is applied to the MD1. The optical pickup 2 applies a laser beam that is stronger than that during reproduction onto a portion on the MD 1 to which the magnetic field is being applied. Thus, the audio data is recorded (dubbed) on the MD 1.

After completion of the recording operation (data transferring operation) on the desired recordable area, the system controller 9 controls the memory controller 5 so that the TOC information stored in the shock-proof memory 6 is updated. After the updating process, the system controller 9 conducts managements of the audio data recorded on the MD 1 or other operations by using the updated information as the newest TOC information.

In the case of recording (dubbing) on the MD 1 digital audio data from a CD 21 that is reproduced by the CD reproduction apparatus 20, the switch 19 is controlled by the system controller 9 so that the common terminal 19c is on the 19b side. In this case, the audio data is sent from the CD reproduction apparatus 20 to the audio signal extension-compression circuit 7 using a bit rate that is higher than the normal reproduction bit rate of the CD 21. After this, the recording operation is carried out in the same manner as the aforementioned recording operation on the analog audio signals; therefore, the explanation thereof is omitted.

Figure 2:
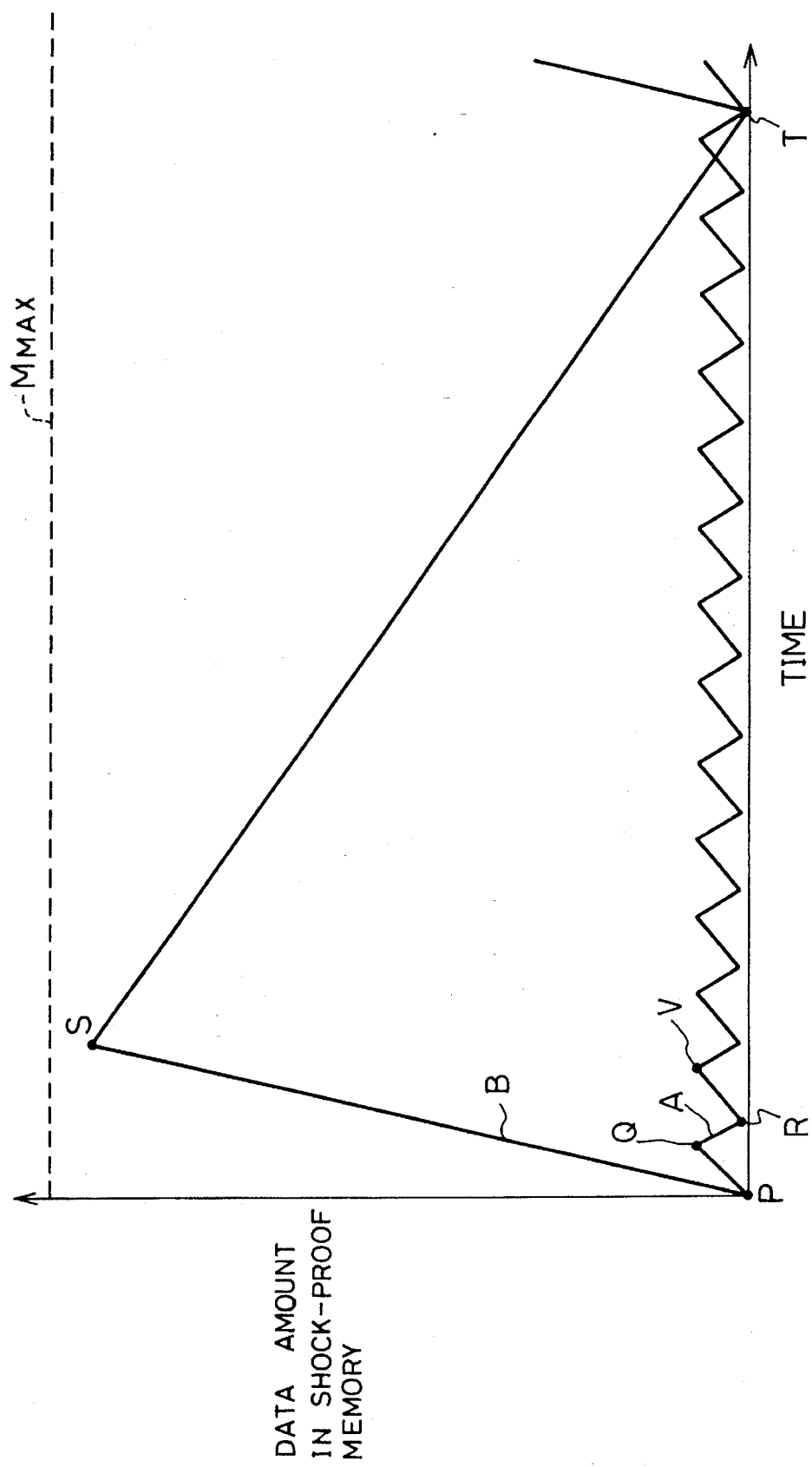
FIG. 2 is an explanatory drawing that shows one example of the controlling method of a shock-proof memory in the mini disk apparatus.

Next, referring to FIG. 2, the following description will discuss an example of control on the shock-proof memory 6.

In FIG. 2, $M_{MAX}$ represents the maximum allowable amount of data storage of the shock-proof memory 6. Characteristic A shows the time-wise variation of the amount of data that remains in the shock-proof memory 6 in the case where the switch 19 is on the contact 19a side (the A/D converter 8b side)(see FIG. 1). Characteristic B shows the time-wise variation of the amount of data that remains in the shock-proof memory 6 in the case where the switch 19 is on the contact 19b side (the CD reproduction apparatus 20 side)(see FIG. 1).

When the switch 19 is on the contact 19a side, the audio data is sent from the A/D converter 8b to the audio signal extension-compression circuit 7 at the normal transmission speed. Thereafter, the memory controller 5 starts storing the audio data in the shock-proof memory 6 (see point P). When the amount of data stored in the shock-proof memory 6 reaches an amount of data corresponding to the minimum recording unit of the MD 1, an accessing process to a desired recording portion on the MD 1 is carried out, thereby starting a recording operation of the audio data onto the MD 1 (see point Q).

The recording operation of the audio data onto the MD 1 is carried out at a bit rate of virtually five times as great as that used when the audio data is inputted to the shock-proof memory 6. For this reason, the amount of data stored in the shock-proof memory-6 decreases at a rate indicated by line QR during the recording operation on the MD 1. More specifically, the amount of data stored in the shock-proof memory 6 decreases at a time-wise rate of change that is greater than that used in the case of storing the audio data in the shock-proof memory 6 (indicated by line PQ).

Upon completion of the recording of the audio data in the amount corresponding the minimum recording unit of the MD 1 (see point R), the recording operation is stopped until the amount of data stored in the shock-proof memory 6 again reaches the amount of data corresponding to the minimum recording unit of the MD 1 (see point V).

In accordance with the above-mentioned controlling method of the shock-proof memory 6, the amount of data to be stored in the shock-proof memory 6 is always kept at a smaller amount in comparison with the maximum allowable amount of data storage $M_{MAX\ X}$. In other words, the shock-proof memory 6 is always used with its amount of data close to the empty state. For this reason, even in the event of any disturbance such as a mechanical shock in the MD apparatus, the shock-proof memory 6 makes room for time required for the recovery operation (retrying operation). This makes it possible to provide a highly reliable data dubbing method.

Meanwhile, when the switch 19 is on the contact 19b side, the digital audio data to be recorded is stored in the shock-proof memory 6 at a bit rate that is, for example, virtually four times as great as the normal reproduction bit rate. In characteristic B of FIG. 2, line PS corresponds to a section wherein the stand-by state of the recording operation and the accessing and track jumping processes with respect to a recording portion take place. In comparison with characteristic A, characteristic B allows the audio data to be stored in the shock-proof memory 6 at a time-wise rate of change virtually four times as great. In characteristic B, line ST corresponds to a section wherein the audio data read out from the shock-proof memory is written (dubbed) in the MD 1. Even during the writing operation, the audio data is being stored in the shock- proof memory 6 at the bit rate that is virtually four times as great as the normal reproduction bit rate. This results in a decrease in the time-wise rate of change in the decreasing amount of data to be stored in the shock-proof memory 6 in comparison with characteristic A.

When the amount of data to be stored in the shock-proof memory 6 before the start of the recording operation is increased within a range up to $M_{MAX}$, the shock-proof memory 6 allows the MD 1 to successively record more amount of audio data that corresponds to more minimum recording units. However, the more the amount of data is increased, the more difficult it becomes for the shock-proof memory 6 to make room for time required for the recovery operation. Generally, in the case of making data dubbing by the use of a CD reproduction apparatus 20, even in the event of any external disturbance such as a mechanical shock, the MD apparatus is less susceptible to the influence; this makes it different from the case of making data dubbing by the use of the A/D converter 8b. For this reason, in the case of making data dubbing by the use of a CD reproduction apparatus 20, it is not necessary to give consideration to the possibility of any disturbance. Therefore, one accessing process allows a continuous recording for a longer period; this reduces the probability of failure in the accessing process. Thus, this case provides higher reliability in dubbing the audio data onto the MD 1.

Figure 3:
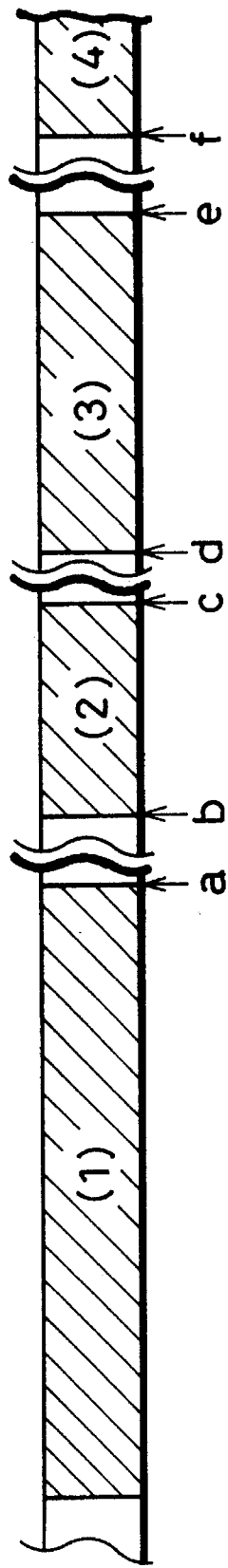
FIG. 3 is an explanatory drawing that shows a mini disk whereon a plurality of recordable areas are intermittently located in the mini disk apparatus.

However, in the case where the MD 1 is provided with recordable areas that are intermittently disposed in such a manner as recordable area (1), recordable area (2), recordable area (3), recordable area (4) . . . as shown in FIG. 3, if the amount of data to be stored in the shock-proof memory 6 before the start of the recording operation is increased within a range up to $M_{MAX}$, there is a possibility that an overflow occurs in the shock-proof memory 6. The reasons for this are explained as follows: At the time when the recording operation is transferred from one recordable area to the next recordable area (see point a, point c and point e in FIG. 3), the amount of data remaining in the shock-proof memory 6 is indefinite (see point a, point c and point e in FIG. 4). Further, even during the stand-by state of the recording operation and the accessing process to a recording portion (including the track jumping process) (see section ab and section cd in FIG. 4), the audio data is being continuously stored in the shock-proof memory 6. Here, as shown in FIG. 4, since the amounts of data to be recorded in the recordable areas (1) and (3) are comparatively large, the system controller 9 can not record all the audio data in one recording operation; thus, the recordings are made twice in a divided manner.

Figure 4:
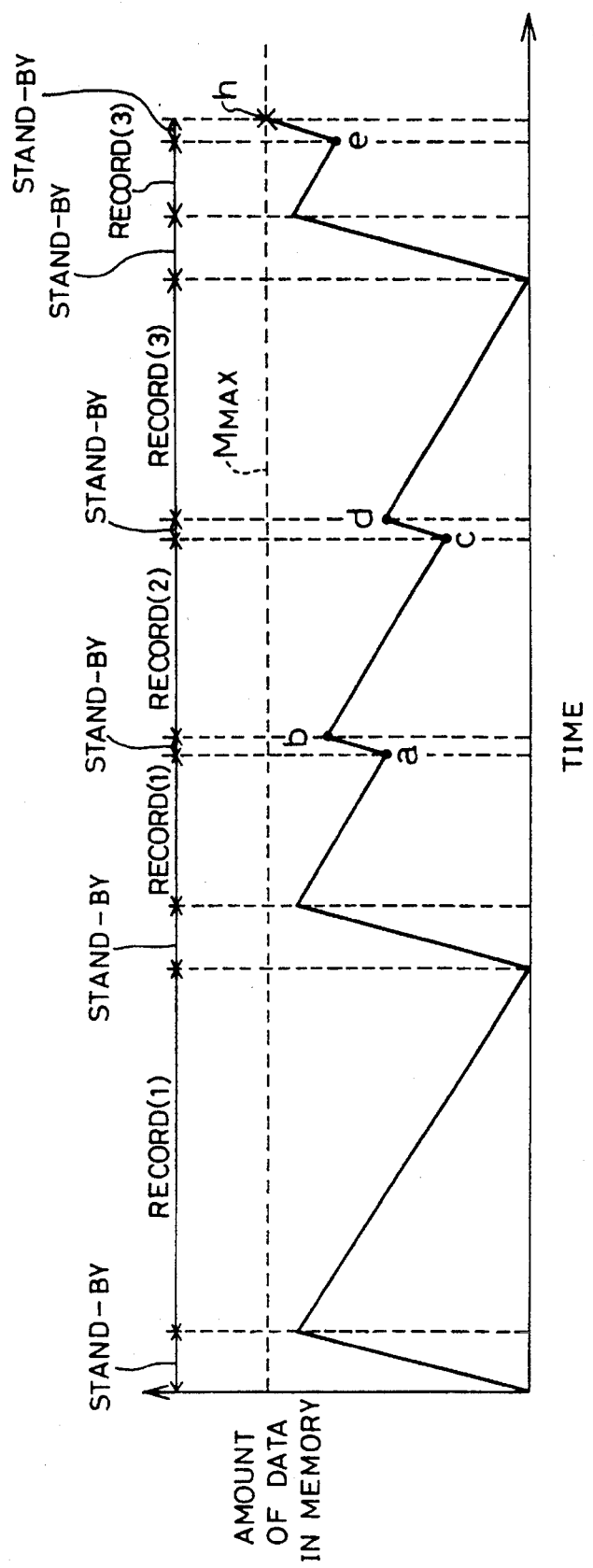
FIG. 4 is an explanatory drawing that shows one example where dubbing is made on the mini disk by using a conventional high-speed dubbing method.

Therefore, for example, in the case where the amount of data remaining in the shock-proof memory 6 varies with time as shown in FIG. 4, the amount of data remaining in the shock-proof memory 6 reaches the maximum allowable amount of data storage $M_{MAX}$ at point h after completion of the recording operation onto recordable area (3). Thus, an overflow occurs in the shock-proof memory 6.

In order to solve the above problem in the case where the MD 1 is provided with recordable areas that are intermittently disposed in such a manner as recordable areas (1), (2), (3), (4) . . . as shown in FIG. 3, the present embodiment provides the following means.

The system controller 9 recognizes positions of the recordable areas (1) . . . on the MD 1, that is, the leading position and rear position of each recordable area. Then, in accordance with the current position of the optical pickup 2 and the respective positions of the recordable areas thus recognized, the system controller 9 calculates time that is required for allowing the optical pickup 2 to access the leading position of the recordable area for the next recording.

In addition to the positions of the respective recordable areas identified as described above and the time required for the accessing process, the system controller 9 calculates waiting time by which the amount of remaining data stored in the shock-proof memory 6 is minimized upon completion of the data transferring process to the next recordable area. When executing the above calculation, the system controller 9 takes into consideration the bit rate to the MD 1, the transmission speed at which the audio data is stored in the shock-proof memory 6, and other factors. Thereafter, the system controller 9 stops the recording operation for the above-mentioned waiting time. During the stop of the recording operation, in order to reduce the power consumption, the power on/off circuit 14 shuts off the power supply to a data transferring operation means that consists of the driver circuit 11, the optical pickup 2, the RF amplifier 3, the servo circuit 10, the encoder-decoder/signal processing circuit 4, etc.

More specifically, the system controller 9 calculates time $T_{AC}$ that is required for the accessing process, based on the rear position of the recordable area on which recording is currently made, the leading position of the recordable area for the next recording (i.e., recording start position), the shifting speed of the optical pickup 2, etc. Then, the system controller 9 calculates the difference ($S_R - S_M$) between the recording bit rate $S_R$ of the audio data to the MD 1 and the transmission bit rate $S_M$ of the audio data to the shock-proof memory 6. Further, the system controller 9 recognizes the leading position and rear position of the recordable area for the next recording, and calculates the amount of data that is to be recorded in the recordable area in accordance with the positional information.

Here, the target minimum amount of the remaining audio data to be stored in the shock-proof memory 6 is designated by $R_O$; the amount of the remaining audio data in the shock-proof memory 6 at the time of completion of the recording operation with respect to the currently used recordable area is designated by R; and the total amount of the audio data to be recorded in the next recordable area is designated by $D_R$. Then, the waiting time $T_W$ is found from the equation: $(S_M \times T_W) + R = (D_R + R_O)$. That is, the following equation (a) holds:

$$T_W = \{(D_R + R_O) - R\}/S_M \qquad (a).$$

Here, the amount R of the remaining audio data is supposed to be equal to the target minimum amount of the remaining audio data $R_O$; therefore, the following equation (b) is obtained by substituting R by $R_O$.

$$T_W = D_R/S_M \qquad (b).$$

This waiting time $T_W$ includes the time $T_{AC}$ that is required for the accessing process to the next recordable area. In other words, the waiting time $T_W$ is equal to, or longer than the time $T_{AC}$ that is required for the accessing process to the next recordable area: that is, $T_W \geq T_{AC}$ holds.

In this case, the time t that is required from the recording start to the recording end with respect to a recordable area is represented by the following equation (c):

$$t = D_R/(S_R - S_M) \qquad (c).$$

Figure 5:
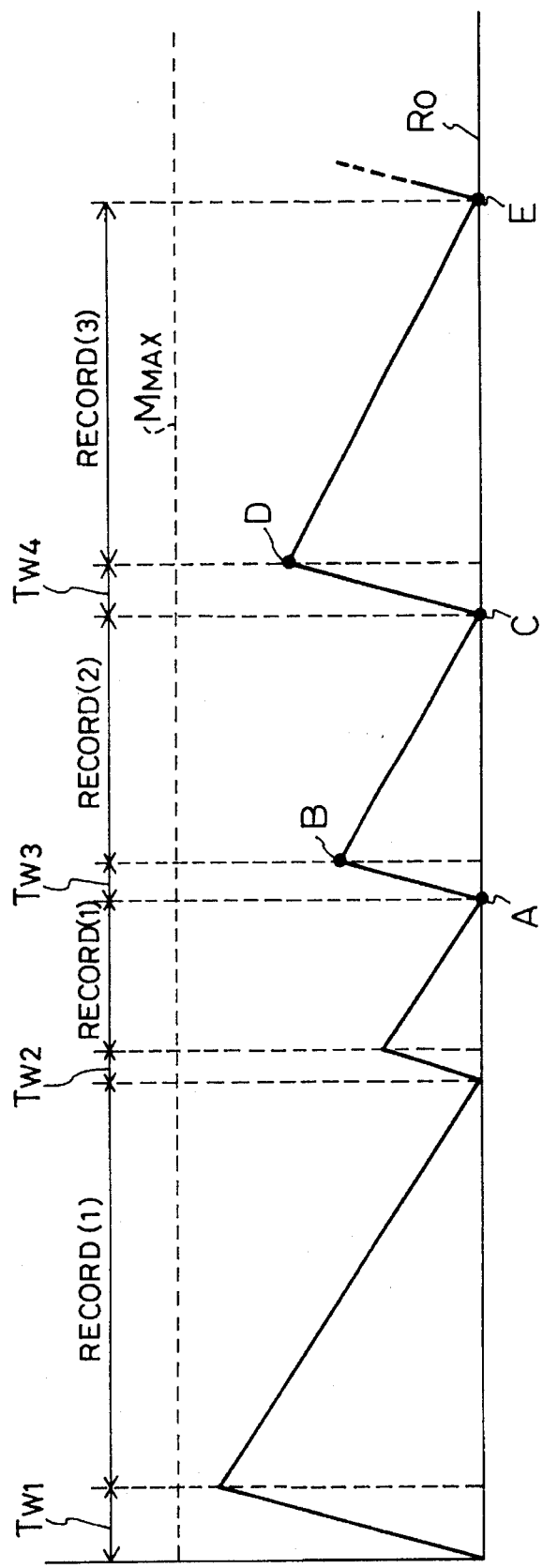
FIG. 5 is an explanatory drawing that shows one example where dubbing is made on the mini disk by using the high-speed dubbing method of the present invention.

Referring to FIG. 5, the following description will discuss a case wherein audio data is recorded on recordable areas (1) through (3).

As shown in FIG. 5, since the amount of data to be recorded in the recordable area (1) exceeds the maximum allowable amount of data storage $M_{MAX}$, the system controller 9 can not record all the audio data in one recording operation; thus, the recordings are made twice in a divided manner. In other words, the system controller 9 finds the waiting times $T_{W1}$ ($=D_{R1}/S_M$) and $T_{W2}$ ($=D_{R2}/S_M$) respectively, in accordance with the amounts of data $D_{R1}$ and $D_{R2}$ that are respectively recorded in the first process and the second process.

Next, according to the above-mentioned equation (b), the system controller 9 calculates the waiting time $T_{W3}$ from the completion of the second recording with respect to the recordable area (1) (see point A) to the start of the recording with respect to the recordable area (2) (see point B). Then, the recording operation is stopped for the waiting time $T_{W3}$, and the accessing process and the track jumping process are carried out with respect to the leading position of the recordable area (2). After the waiting time $T_{W3}$ has elapsed, the system controller 9 starts the recording operation with respect to the recordable area (2), and completes the operation at the time indicated by point C. At this time, the amount of the remaining audio data in the shock-proof memory 6 is $R_O$.

Next, according to the above-mentioned equation (b), the system controller 9 calculates the waiting time $T_{W4}$ from the completion of the recording with respect to the recordable area (2) (see point C) to the start of the recording with respect to the recordable area (3) (see point D). Then, the recording operation is stopped for the waiting time $T_{W4}$, and the accessing process and the track jumping process are carried out with respect to the leading position of the recordable area (3). That is, immediately before the accessing process and the track jumping process, the amount of the remaining audio data in the shock-proof memory 6 is always kept minimum, that is, kept at $R_O$. After the waiting time $T_{W4}$ has elapsed, the system controller 9 starts the recording operation with respect to the recordable area (3), and completes the operation at the time indicated by point E. At this time, the amount of the remaining audio data in the shock-proof memory 6 is $R_O$.

As described above, in accordance with the high-speed dubbing method of the present embodiment, the system controller 9 calculates the waiting time $T_W$ by which the amount of remaining audio data stored in the shock-proof memory 6 is minimized upon completion of the data transferring process to the next recordable area, and by stopping the recording operation for the waiting time $T_W$, the amount of the remaining audio data in the shock-proof memory 6 is always kept minimum, immediately before the accessing process and the track jumping process with respect to the next recordable area. Therefore, even if any disturbance occurs during a dubbing operation on the MD 1 that has a plurality of intermittent recordable areas, the high-speed dubbing method of the present embodiment makes it possible to eliminate the overflow from the shock-proof memory 6, and to improve the reliability of the dubbing operation.

Additionally, in the present embodiment, the above-mentioned explanation was made as to how to find the waiting time; however, the present invention is not intended to be limited to the above-mentioned example. Any method may be adopted as long as the waiting time is set so that the amount of the remaining audio data in the shock-proof memory 6 is always kept minimum, immediately before the accessing process and the track jumping process with respect to the next recordable area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high-speed data dubbing method comprising the steps of:

storing data externally transmitted in a memory at a transmission speed that is higher than that of normal reproduction, but lower than a transfer speed to a recording medium;

recognizing respective recording start positions in accordance with positional information of the recording medium having a plurality of intermittent recordable areas possibly having varying lengths;

recognizing amounts of data to be recorded in the recordable areas including the respective recording start positions;

calculating waiting time by which the amount of remaining data stored in the memory is substantially emptied upon completion of the data transferring process to the recordable area prior to transferring data to one of the recordable areas, based on the data transfer speed to the memory and the amount of data to be recorded in the recordable area; and interrupting the dubbing operation by stopping the data transferring process for the waiting time.

2. The high-speed data dubbing method as defined in claim 1, wherein the step for calculating the waiting time is carried out prior to shifting from the data transferring process onto a first recordable area to the data transferring process onto a second recordable area.

3. The high-speed data dubbing method as defined in claim 1, further comprising the steps of: dividing the amount of data and calculating a plurality of periods of waiting time, when the amount of data to be recorded to one of the recordable areas exceeds a maximum allowable amount of data storage of the memory.

4. The high-speed data dubbing method as defined in claim 1, further comprising the step of transferring the data to the recordable area after the waiting time has elapsed.

5. The high-speed data dubbing method as defined in claim 4, wherein the positional information is read out from the recording medium.

6. The high-speed data dubbing method as defined in claim 1, further comprising the step of storing in the memory the positional information of the recordable areas on the recording medium prior to carrying out the respective steps.

7. The high-speed data dubbing method as defined in claim 1, wherein the step of recognizing the recording start positions further includes the step of recognizing the leading position of each recordable area.

8. The high-speed data dubbing method as defined in claim 1, wherein the step of recognizing the recording start positions further includes the step of recognizing the rear position of each recordable area.

9. The high-speed data dubbing method as defined in claim 1, wherein the step of recognizing the amount of data further includes the steps of: recognizing the leading position and the rear position of the recordable area; and calculating the amount of data to be recorded in the recordable area in accordance with the positional information indicating the leading position and the rear position.

10. The high-speed data dubbing method as defined in claim 1, further comprising the step of calculating time that is required for an accessing process to the recording start position, prior to the step of interrupting the dubbing operation.

11. The high-speed data dubbing method as defined in claim 1, further comprising the step of carrying out the accessing process to the next recording start position while interrupting the dubbing operation.

12. The high-speed data dubbing method as defined in claim 1, further comprising the step of calculating periods of time that are respectively required for the accessing process to the recording start position and a track jumping process prior to the step of interrupting the dubbing operation.

13. The high-speed data dubbing method as defined in claim 1, further comprising the step of carrying out the accessing process to the next recording start position and the track jumping process while interrupting the dubbing operation.

14. The high-speed data dubbing method as defined in claim 1, further comprising the step of calculating the difference between a recording bit rate of the data to the recording medium and a transmission bit rate of the data to the memory, prior to the step of calculating the waiting time.

15. The high-speed data dubbing method as defined in claim 1, further comprising the step of updating the positional information of the recordable areas stored in the memory, after completion of the data transferring process to the recordable area.

16. The high-speed data dubbing method as defined in claim 1, further comprising the step of conducting a data compression on the data.

17. The high-speed data dubbing method as defined in claim 1, further comprising the step of conducting operations such as modulation and addition of error-correcting codes on the data.

18. The high-speed data dubbing method as defined in claim 1, further comprising the step of: converting the analog data into digital data if the data to be dubbed is analog data.

19. The high-speed data dubbing method as defined in claim 1, wherein the data is also being stored in the memory while the data transferring process is being carried out with respect to the recordable area.

20. The high-speed data dubbing method as defined in claim 1, wherein the data is also being stored in the memory while the data transferring process is standing by.

21. The high-speed data dubbing method as defined in claim 1, wherein the data is also being stored in the memory while the accessing process is being carried out with respect to the recordable area.

22. The high-speed data dubbing method as defined in claim 1, wherein the data is also being stored in the memory while the accessing process and the track jumping process are being carried out with respect to the recordable area.

23. The high-speed data dubbing method as defined in claim 1, wherein the data is selected from digital data and analog data.

24. The high-speed data dubbing method as defined in claim 1, wherein the recording medium is magneto-optically recorded.

25. The high-speed data dubbing method as defined in claim 1, wherein the data is transmitted from a compact disk apparatus.

26. The high-speed data dubbing method as defined in claim 1, wherein the data is transmitted from the compact disk apparatus at a speed higher than a normal reproduction bit rate of the compact disk.

27. The high-speed data dubbing method as defined in claim 1, wherein the recording medium is a mini disk.

28. The high-speed data dubbing method as defined in claim 1, the dubbing method is carried out by the use of a mini disk apparatus.

29. The high-speed data dubbing method as defined in claim 28, wherein the mini disk apparatus has a data transferring operation means whose power supply is shut off while the data transferring process is standing by.

* * * * *